E. MARTINSON.
OIL TANK CAR.
APPLICATION FILED AUG. 22, 1914.
1,146,636.
Patented July 13, 1915.
3 SHEETS—SHEET 2.
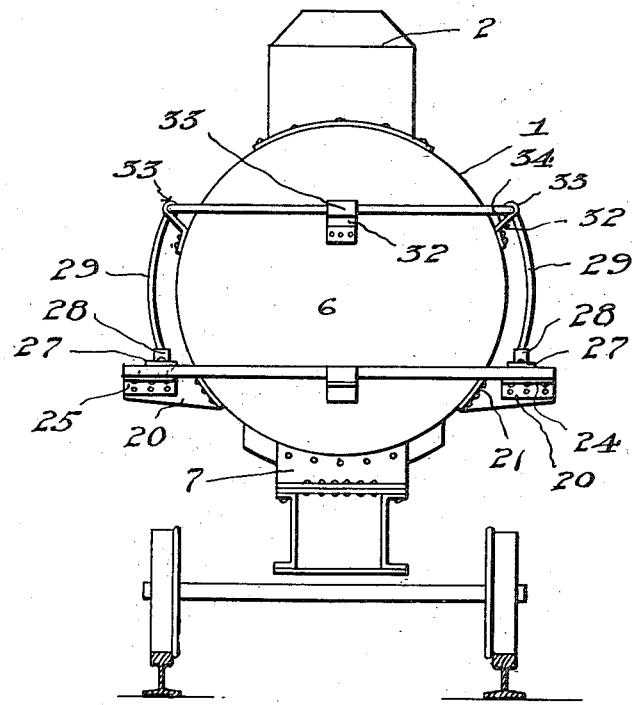
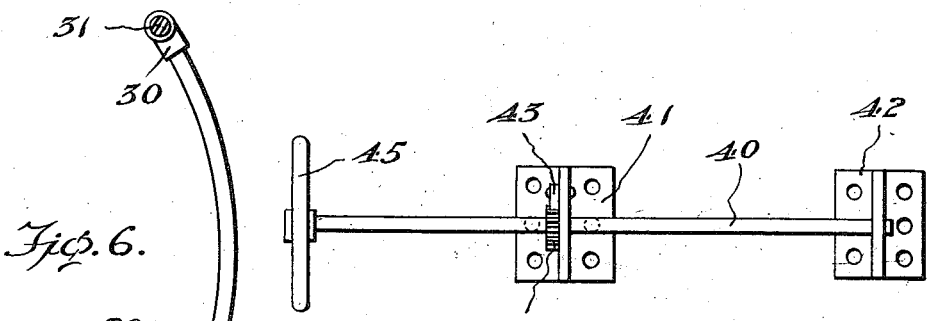
Witnesses
Paul M. Hunt
Robt Meyer
Inventor
Edw. Martinson.
By A. Randolph Jr.
Attorney

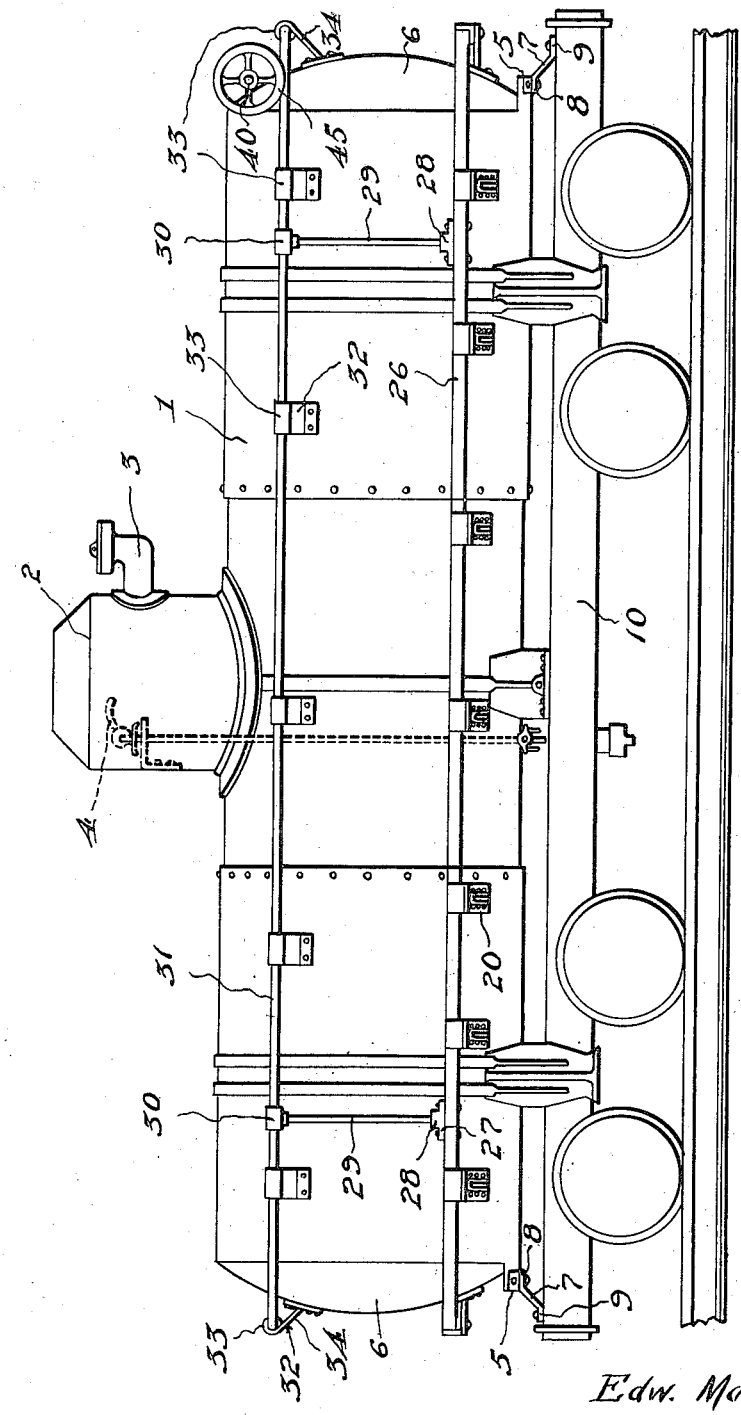

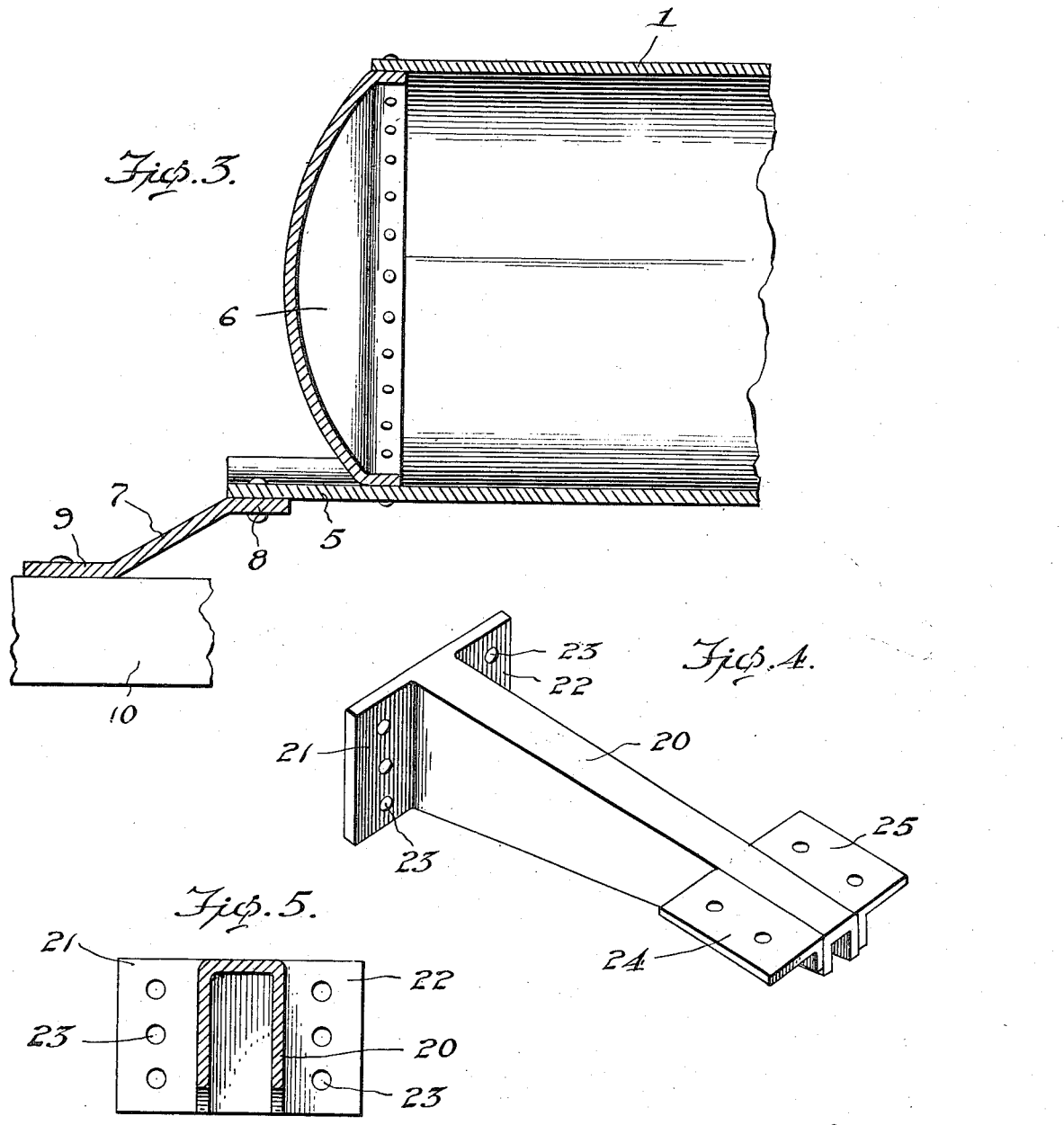

UNITED STATES PATENT OFFICE.

EDWARD MARTINSON, OF SUPERIOR, WISCONSIN.

OIL-TANK CAR.

1,146,636.  Specification of Letters Patent.  Patented July 13, 1915.

Application filed August 22, 1914. Serial No. 858,141.

*To all whom it may concern:*

Be it known that I, EDWARD MARTINSON, a citizen of the United States, residing at Superior, in the county of Douglas and State of Wisconsin, have invented certain new and useful Improvements in Oil-Tank Cars; and I do hereby declare the following to be a full, clear, and exact description of the invention, such as will enable others skilled in the art to which it appertains to make and use the same.

This invention relates to tank cars and the primary object of the invention is the provision of a tank car of improved construction whereby the possibility of the rupturing of the tank by the buffeting of the same during transit is materially decreased.

Another object of this invention is the provision of a tank car which has the bottom or base thereof extended beyond the end for bracing connection with the trucks of the tank car.

A still further object of this invention is the provision of a novel form of running platform support, a novel hand grip and other attachments to a tank car which will render the construction of the car simple, decreasing the cost of manufacture of the same.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like or corresponding parts throughout the several views, and in which:—

Figure 1 is a side elevation of a tank car constructed in accordance with this invention. Fig. 2 is an end view of a tank car constructed in accordance with this invention. Fig. 3 is a fragmentary central sectional view through one end of the tank car showing the elongation formed on the bottom of the tank. Fig. 4 is a detail perspective view of one of the running platform supporting brackets. Fig. 5 is a cross sectional view through the brackets shown in Fig. 4. Fig. 6 is a detail in side elevation of the hand rail standards. Fig. 7 is a detail view of the break operating rod.

Referring more particularly to the drawings, 1 designates the cylindrical body of a tank car which cylindrical body is constructed of sheet metal as is ordinary in the construction of tank cars and it has the dome or cupola 2 secured to the upper side thereof substantially intermediate of its ends, which cupola has communication with the interior of the tank and is provided with a filling tube or nozzle 3 and a lever mechanism 4 for controlling the valve which controls the outlet of fluid from the tank 1.

The tank 1 has longitudinally extending extensions or projections 5 formed upon the end of the base thereof and projecting outwardly from the end pieces 6 of the tank. The projections 5 are arcuate in end view being merely extensions of the lowermost portion of the tank or cylinder 1 and they have supporting brackets 7 secured thereto. The supporting brackets 7 have their upper horizontally disposed portions 8 arcuate to conform to the shape of the extensions 5 and for snug fitting against the under surface of these extensions while the lower horizontal portions 9 of the brackets are positioned for engagement with the trucks 10 of the car for supporting the tank 1 upon the trucks 10. By connecting the extensions 5 to the trucks 10 through the medium of the brackets 7, the tank 1 will be supported upon the truck so that the bumping of the car will not rupture the tank.

The tank 1 has secured at spaced intervals along its length and about or across its end brackets 20, which brackets are formed of channel iron having transversely extending ears or lugs 21 and 22 formed upon one end thereof, which end is of greater height than the forward end of channel iron as is clearly shown in Fig. 4 of the drawings. The transversely extending lugs 21 and 22 are provided with openings 23 extending therethrough, through which openings rivets are inserted for attaching the brackets 20 to the sides and ends of the tank 1. The outer edge of the brackets 20 have angle irons 24 and 25 secured to the sides of the same, which angle irons have one of their arms projecting transversely from the bracket for supporting a running platform 26, which passes about the tank to permit of a trainman walking along the tank.

The running platform 26 has secured thereto brackets 27 which have upstanding sleeves 28 formed integral therewith. The upstanding sleeves 28 have the lower ends of standards 29 inserted therein, which standards are arcuate to conform to the configuration of the outer surface of the tank 1 and these standards 29 have T connections 30 mounted upon their upper ends, in which T connection is seated a hand rail 31, which hand rail extends around the tank 1 above the running platform as is clearly shown in the drawings.

The hand rail 31 has bracing brackets 32 spaced along its length, which supporting brackets have cylindrical bearings 33 through which the hand rail extends and arms 34 projecting from the sleeves and formed thereon. The arms 34 have transversely extending lugs formed upon their lower ends, which lugs are riveted or otherwise securely fastened to the sides of the tank 1.

The break controlling rod 40 is positioned horizontally across one end of the tank 1 adjacent the uppermost portion of the tank and it is rotatably seated in brackets 41 and 42. The bracket 42 has a pawl 43, carried thereby which engages a ratchet 44 carried by the rod 40 for preventing the reverse rotation of the rod. A hand wheel 45 is mounted upon the end of the rod 40 to provide for the manual rotation thereof for either setting or releasing the break of the car.

In reducing the invention to practice certain minor features of construction, combination and arrangement of parts may necessitate alterations to which the patentee is entitled provided such alterations are comprehended within the scope of what is claimed.

What is claimed is:—

In a tank car, the combination with an ordinary car truck, of a retaining tank having extensions formed upon the ends of said tank and integrally with the construction thereof, brackets having horizontal portions formed thereupon for attachment to said car truck, arcuate horizontal portions formed upon the upper ends of said brackets for engagement to said projections for supporting said tank upon said truck.

In testimony whereof I affix my signature in presence of two witnesses.

EDWARD MARTINSON.

Witnesses:
GUST GUENSON,
THOMAS SELBECK.